July 13, 1926. 1,591,965
M. J. DAVIS
STABILIZER FOR MOTOR VEHICLES
Filed Feb. 25, 1924   2 Sheets-Sheet 2
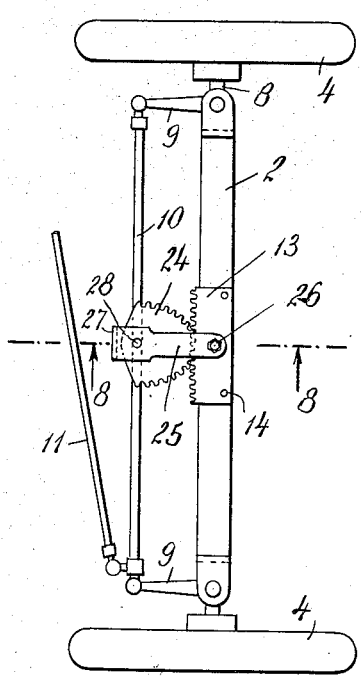
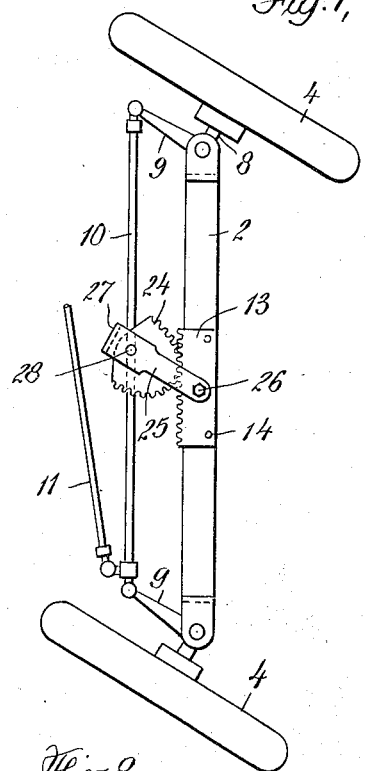
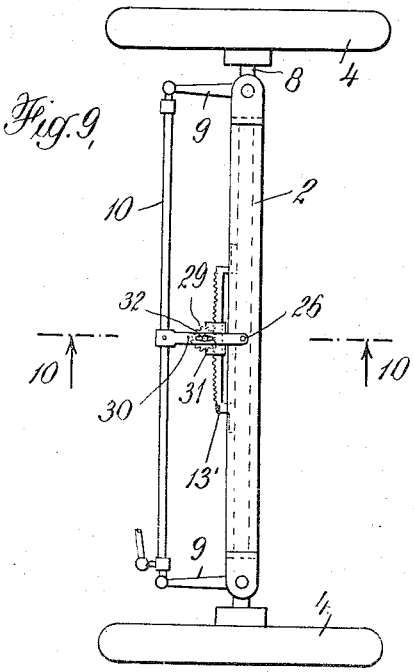
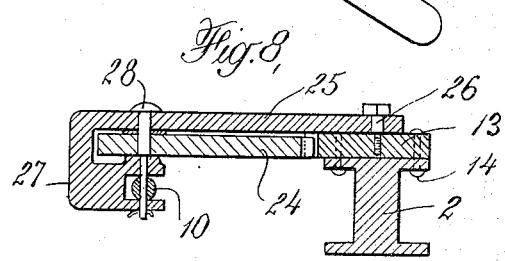
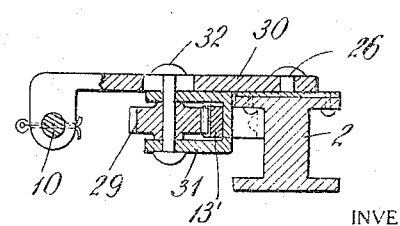
INVENTOR
Michael J. Davis
BY
ATTORNEYS Patented July 13, 1926.

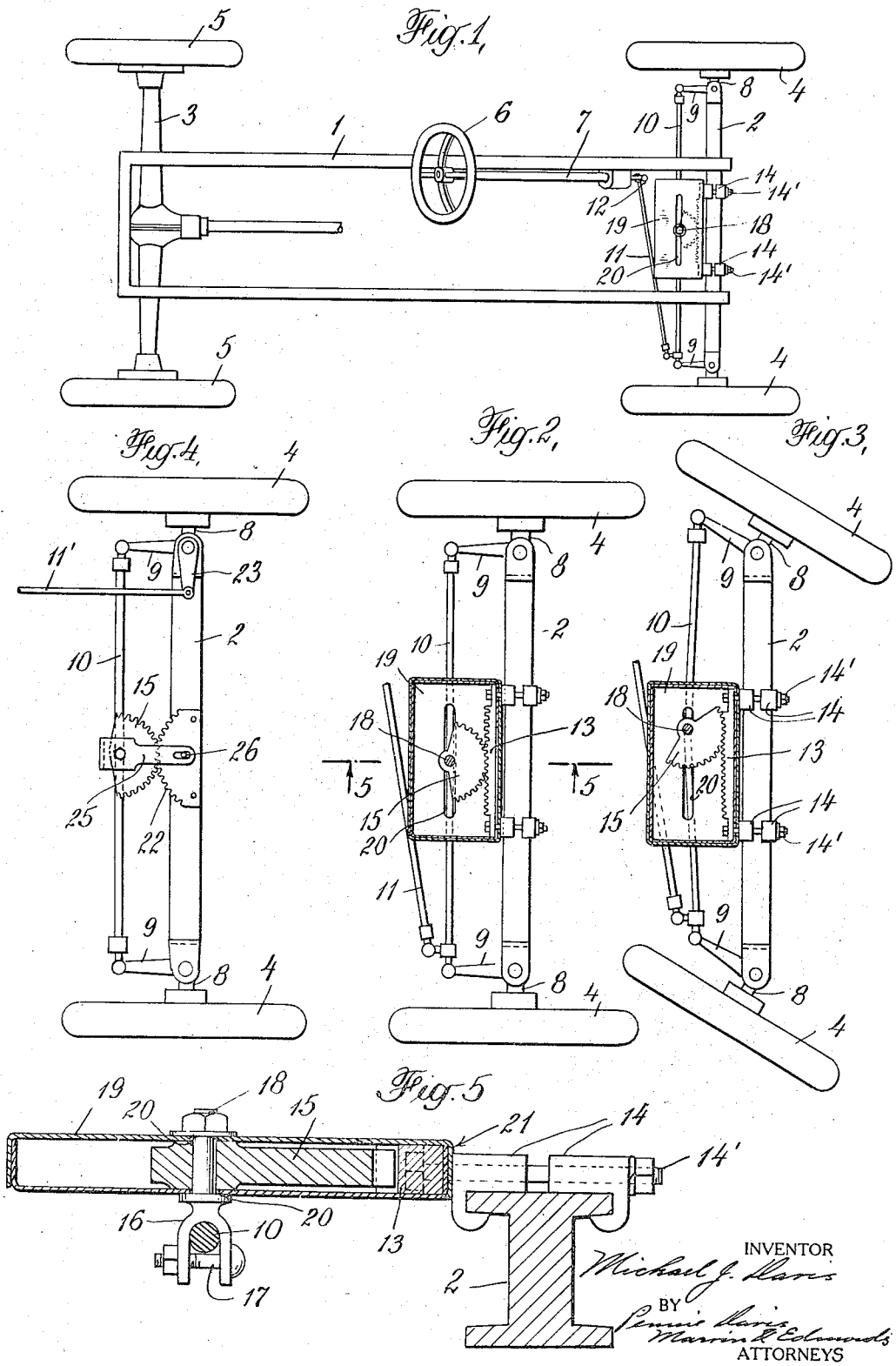

1,591,965

UNITED STATES PATENT OFFICE.

MICHAEL J. DAVIS, OF BROOKLYN, NEW YORK.

STABILIZER FOR MOTOR VEHICLES.

Application filed February 25, 1924. Serial No. 694,832.

This invention relates to steering systems for motor vehicles, and more particularly to means for stabilizing the steering system of a motor vehicle whereby the operation of the steering gear is rendered smooth and highly efficient, and the danger of the steering gear getting out of the control of the operator greatly minimized.

One of the objects of my invention is to provide means for steadying the movement of the rod connecting the steering knuckles of an ordinary steering system. It is well known that the rod connecting the steering knuckles is ordinarily wholly without support of any kind, and that this condition assumes dangerous characteristics when one front wheel of the vehicle is off the ground. At such a time there is a strong tendency for the steering apparatus to get out of the operator's control, this being particularly true with motor vehicles which are provided with a single link connecting the steering column directly with one of the steering knuckles. The movement of the steering gear of a motor vehicle having a drag link extending directly back from one of the steering knuckles and connected by means of a crank to a transverse shaft which is turned by the steering column is inherently steadier than that of the more simple construction above mentioned, but even in this case the steering system is greatly in need of stabilization, particularly when one front wheel is off the ground.

A further object of my invention is to provide means for exerting a force on the rod connecting the steering knuckles so as to prevent these parts from chattering at the points where they come in contact with each other. It is well known that after a motor vehicle has been operated for a short time the bushings at the ends of the cross link or connecting rod extending between the steering knuckles become so worn that there is considerable play between these parts. The chattering of these parts which occurs after the parts have become worn serves to increase the wear and to make the steering system noisy. By means of my invention the steering system of a motor vehicle can be stabilized at the point where such action is most effective, and the rod connecting the steering knuckles can be prevented from chattering.

In the accompanying drawings I have illustrated several embodiments of my invention applied to various types of steering systems. In these drawings, Fig. 1 is a plan view illustrating the chassis and steering system of a motor vehicle provided with my improved stabilizing mechanism.

Figs. 2 and 3 are enlarged plan views partly in section of the stabilizing mechanism shown in Fig. 1, the two figures showing different positions of the steering gear.

Fig. 4 is an enlarged plan view of a different type of steering system showing a modified form of the invention applied thereto.

Fig. 5 is a vertical section view taken on line 5—5 of Fig. 2 showing certain details of construction.

Fig. 6 is a plan view, partly in section, illustrating another embodiment of the invention.

Fig. 7 is a plan view of an embodiment of the invention similar to that shown in Fig. 6.

Fig. 8 is a vertical section view taken on line 8—8 of Fig. 6 showing the details of construction, the gear housing being omitted.

Fig. 9 is a plan view of a further embodiment of my invention, and

Fig. 10 is a vertical section view taken on line 10—10 of Fig. 9 showing the details of construction.

In Fig. 1 I have illustrated a motor vehicle chassis comprising a frame 1, front and rear axles 2 and 3, and front and rear wheels 4 and 5, respectively. The usual hand steering wheel is shown at 6, connected to a steering post or column 7. The front wheels 4 are mounted on spindles 8 (see Figs. 2 and 3) which are carried by the usual steering knuckles mounted at the ends of the front axle 2. The steering knuckles are provided with the usual arms 9 connected by a rod 10. In the well known type of steering system shown in Figs. 1 to 3, inclusive the steering knuckles are turned by means of a single link 11, connecting a crank 12 at the base of the steering column 7 with one end of the connecting rod 10. When the hand wheel 6 is turned, the link 11 moves longitudinally by virtue of its connection with the crank 12, and this movement of the link 11 turns the steering knuckles which are connected by the rod 10 so as to cause them to turn in unison.

My improved stabilizer mechanism comprises members cooperating with a movable part of the steering gear, for example, the connecting rod 10, and a stationary part of the chassis, such as the front axle 2. The embodiment of the invention illustrated in Figs. 1 to 3 incl. comprises a toothed member in the form of a rack 13 fixed to the front axle 2 in any suitable manner, for example by means of the clamping lugs 14 and bolts 14'. The rack teeth are adapted to be engaged by a gear segment 15 carried by the connecting rod 10. This gear segment may take any one of a number of different forms as will be explained hereinafter, but in Figs. 1 to 3 this segment is a part of an ordinary circular gear. This gear is pivoted to the connecting rod 10 in any convenient manner. In Fig. 5 I have illustrated a coupling member 16 fixed to the rod 10 by means of a bolt 17. The gear segment 15 is pivoted to the coupling 16 by means of a bolt 18 carried by the coupling. I prefer to provide some means for positively holding the gear segment 15 in mesh with the rack 13 so that it is impossible for these parts to become disengaged.

This function of holding the gear segments in mesh can be performed by the housing which I prefer to employ for the purpose of enclosing the toothed members. A housing 19 is shown in Figs. 1 to 3 incl. and Fig. 5, this housing being preferably made in two parts and clamped to the front axle 2 as shown at 21 by means of the bolts 14'. Slots 20 are provided in this housing for the purpose of guiding the gear segment 15 and holding this segment in mesh with the rack 13. The bolt 18 passing through the gear segment 15 projects through the slots 20. Where a segment of a circular gear is employed, the slots 20 should be straight as shown, but if gear segments such as those hereinafter described are employed, the slots should be shaped so as to provide for the necessary movement of the central section of the rod 10.

The housing 19 serves not only as a means for guiding the gear segment 15 and holding this segment in position against the rack 13, but it also prevents grit or foreign particles at any time from getting between the gear teeth. While this housing is not shown in conjunction with all of the embodiments hereinafter described, yet it is to understood that the housing can be used with any of these embodiments.

Figs. 2 and 3 illustrate the manner in which the invention operates to stabilize the steering system. Fig. 3 shows the parts in the positions they occupy after the steering wheel 6 has been turned to move the front wheels 4 to an extreme angular position. By comparing Figs. 2 and 3 it will be understood that as this movement of the front wheels takes place, the gear segment 15 rolls on its rack support, the gear segment being guided and held in mesh with the rack by means of the slots 20 in the housing 19. The part of the connecting rod 10 to which the gear segment is attached must necessarily remain at the same distance away from the rack 13, but the ends of the rod 10 swing around in arcs determined by the steering arms 9. The stabilizing mechanism is preferably located at the center of the rod 10 so that the forces produced by this mechanism on the connecting rod 10 are properly balanced. The effect of the stabilizing mechanism on the connecting rod 10 as the front wheels 4 are turned, is to bend or spring this rod as shown in Fig. 3. A force is thus applied to the connecting rod 10 which increases in magnitude as the front wheels are turned further from their normal positions. The segment 15 can be made just large enough so that there is no initial tension on the rod 10, or it can be made of such dimensions that this rod is initially bent to a slight extent. The rod 10 acts like a spring, being flexed by the stabilizing mechanism, and this action makes it impossible for the joints at the ends of this rod to chatter. This spring action has a very noticeable tendency to return the front wheels to their normal positions in alignment with the vehicle.

Fig. 4 shows the other common type of steering system, which has a drag link 11' extending straight back from a crank 23 connected to one of the spindles 8. The embodiment of the invention illustrated in this figure comprises a gear segment 15 carried by the connecting rod 10 in the manner above described. Instead of this gear segment engaging a straight rack, however, this gear engages another segment of an ordinary circular gear, this second segment 22 being fixed to the chassis in substantially the same manner as the rack above referred to is fixed to the front axle 2. If the sum of the radii of these two gear segments is substantially equal to the length of one of the arms 9, the stabilizing mechanism does not produce any appreciable distortion of the connecting rod 10, but if it is desired to flex this rod when the front wheels 4 are turned from their normal positions, the fixed gear segment 22 can be made with a radius of curvature somewhat larger, so that this stationary member will function in a manner similar to that above described in connection with the rack 13 of Fig. 2.

In Figs. 6 and 7 I have illustrated another embodiment of my invention, consisting of an elliptical gear segment 24 pivoted to the connecting rod 10 and cooperating with a rack 13 fixed to the front axle 2. This elliptical gear can be constructed so that the central section of the rod 10 swings around in an arc exactly the same as it would if there were no stabilizing mechanism used at all, in which case the operation of a stabilizing mechanism is as shown in Fig. 7. If this elliptical gear segment is constructed so that it is almost circular, however, the rod 10 bends each time the front wheels are turned by means of the steering wheel. In both embodiments of the invention illustrated in Figs. 4 and 6, I prefer to provide some means for holding the two toothed members in engagement with each other. This can be accomplished by means of an arm 25 connecting the coupling fastened to the rod 10, with a pin or stud 26 fixed to the axle 2. This arm causes the central section of the rod 10 to swing about in an arc of a circle as the movable gear segment rolls along the stationary toothed member. If these toothed parts are constructed so that they bend the rod 10 when the front wheels are turned to one side, the arm 25 should be provided with a slot, as shown at 26', so that the effective length of this arm from the pin 26 to the center of the rod 10 can change as necessity requires.

The details of the embodiment illustrated in Figs. 6 and 7 are shown in Fig. 8. The coupling fixed to the rod 10 is shown at 27, and the gear segment 24 is pivoted to this coupling by means of a bolt 28. The arm 25 above referred to can be formed as an integral extension of the coupling 27.

It will be noted that in all of the embodiments of the invention above described, the center of the movable gear segment is substantially in line with the connecting rod 10. It is not essential to have this particular relation of the parts, however, as will be seen by referring to Figs. 9 and 10. The embodiment illustrated in these figures comprises a stationary rack 13' fixed to the axle 2 in the manner above described, and a pinion 29 cooperating with this rack. The pinion cooperates with a link 30 which is pivoted to the connecting rod 10. A stub or pin 26 is provided on the front axle 2, and the link 30 is preferably made of substantially the same length as the steering arms 9 and is pivoted not only to the rod 10 but also to the stud 26 so as to permit the central section of the rod 10 to swing about in an arc just as though there were no mechanism attached thereto. The pinion 29 is carried by a shoe 31 which extends around the rack 13' (see Fig. 10). The shoe 31 holds the pinion in position against the rack teeth by virtue of a pin 32 extending through the pinion and the free ends of the shoe 31. The pin 32 projects through a slot formed in the link 30 which therefore causes the pinion to roll back and forth whenever the front wheels 4 are turned to one side or the other. The longitudinal movement of the connecting rod 10 causes the link 30 to swing to one side or the other, and this movement of the link 30 carries the pinion along the rack.

An outstanding feature of my invention consists in the provision of toothed members connected to a movable part of the steering system of a vehicle and to a stationary part thereof, these toothed members being arranged so that they are normally in mesh at all times. I am aware that others have attempted to provide means for stabilizing the steering systems of motor vehicles, but the devices heretofore employed either consist of means for positively locking the steering system except when the course of the vehicle is being changed, or else these devices comprise friction members which are not positive in their action and are a frequent source of trouble. By providing toothed members which are adapted to remain in mesh throughout the normal movement of the steering apparatus, I have provided means for steadying the movement of the steering mechanism without rendering the mechanism inoperative at any time. Accordingly, I have provided means for stabilizing a steering mechanism which is far superior to the devices heretofore employed in that there is no danger of accidentally locking the steering system.

It will be understood that the details of construction can be modified in many ways without departing from the spirit of the invention, which is not limited to the particular embodiments illustrated and described, but includes such modifications thereof as fall within the scope of the appended claims.

I claim:

1. The combination with an axle, steering knuckles connected to each end thereof, and a rod connecting said knuckles to cause them to turn simultaneously; of a toothed member fixed with respect to said axle, a second toothed member engaging said first member, and means for mounting said second member on said rod whereby said rod is steadied by the toothed member throughout all movements of the rod.

2. The combination with an axle, steering knuckles connected to each end thereof, and a rod connecting said knuckles to cause them to turn simultaneously; of a toothed member fixed with respect to said axle, a second toothed member engaging said first member, means for mounting said second member on said rod, and means for holding said toothed members in mesh at all times.

3. The combination with an axle, steering knuckles connected to each end thereof, and a rod connecting said knuckles to cause them to turn simultaneously; of a toothed member fixed with respect to said axle, a second toothed member engaging said first member, means for mounting said second member on said rod, and means extending between said rod and said axle for holding said toothed members in mesh at all times.

4. The combination with an axle, steering knuckles connected to each end thereof, and a rod connecting said knuckles; of a toothed member fixed with respect to said axle, a second toothed member constantly engaging said first member, and pivoted to said rod, and means extending between said rod and said axle for holding said toothed members in mesh at all times.

5. The combination with an axle, steering knuckles connected to each end thereof, and a rod connecting said knuckles; of a toothed member fixed with respect to said axle, and a curved toothed member engaging said first member and pivoted to the central portion of said rod, the said toothed members being shaped so that they cooperate to prevent the portion of the rod to which said curved member is pivoted from swinging freely toward said axle when the steering knuckles are turned.

6. The combination with an axle, steering knuckles connected to each end thereof, and a rod connecting said knuckles to cause them to turn simultaneously; means for steadying the steering mechanism, said means comprising a rack and pinion for flexing said rod when the steering knuckles are turned away from their normal positions in steering the vehicle, while permitting longitudinal movement of said rod.

7. The combination of a rack, means for fixing said rack to the front axle of a motor vehicle, a gear segment adapted to mesh with said rack, means for rotatably mounting said gear segment on the connecting rod of the motor vehicle steering mechanism with the plane of the gear segment being horizontal and parallel to this rod, and means for holding the said gear segment in mesh with the said rack.

8. The combination of a rack, means for fixing said rack to the front axle of a motor vehicle, an elliptical gear segment adapted to mesh with said rack, means for rotatably mounting said gear segment on the connecting rod of the motor vehicle steering mechanism, and means for holding the said gear segment in mesh with the said rack.

9. The combination of a rack, means for fixing said rack to the front axle of a motor vehicle, a gear segment adapted to mesh with said rack, means for rotatably mounting said gear segment on the connecting rod of the motor vehicle steering mechanism with the plane of the gear segment parallel to this rod, and means for holding the said gear segment in mesh with the said rack, the said rack and gear segment having dimensions such that these members prevent the portion of the rod on which said segment is mounted from moving in its usual path when the steering mechanism is operated.

In testimony whereof I affix my signature.

MICHAEL J. DAVIS.